US011150939B2

United States Patent
Mathur et al.

(10) Patent No.: US 11,150,939 B2
(45) Date of Patent: Oct. 19, 2021

(54) COMPOSITE BATCHING TO MANAGE THROUGHPUT FOR ONLINE COMMERCE APPLICATIONS

(71) Applicant: salesforce.com, Inc., San Francisco, CA (US)

(72) Inventors: Ashraya Raj Mathur, Fremont, CA (US); Ranjeeth Karthik Selvan Kathiresan, Concord, CA (US); Samir Pilipovic, Santa Clara, CA (US); Jean Steriti, San Jose, CA (US); Ronnie Fong, San Jose, CA (US); Anshul Kumar, Cupertino, CA (US)

(73) Assignee: salesforce.com, inc., San Francisco, CA (US)

( * ) Notice: Subject to any disclaimer, the term of this patent is extended or adjusted under 35 U.S.C. 154(b) by 253 days.

(21) Appl. No.: 16/289,479

(22) Filed: Feb. 28, 2019

(65) Prior Publication Data

US 2020/0278881 A1 Sep. 3, 2020

(51) Int. Cl.
G06F 9/46 (2006.01)
H04L 29/06 (2006.01)
G06F 9/54 (2006.01)
G06Q 40/00 (2012.01)

(52) U.S. Cl.
CPC .............. *G06F 9/466* (2013.01); *G06F 9/547* (2013.01); *G06Q 40/12* (2013.12); *H04L 63/08* (2013.01)

(58) Field of Classification Search
None
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |

(Continued)

OTHER PUBLICATIONS

Lomotey et al., "SaaS Authentication Middleware for Mobile Consumers of IaaS Cloud", 2013, IEEE, pp. 448-455. (Year: 2013).*

(Continued)

*Primary Examiner* — Kenneth Tang
(74) *Attorney, Agent, or Firm* — Jaffery Watson Mendonsa & Hamilton LLP

(57) ABSTRACT

Embodiments regard composite batching to manage throughput for online commerce applications. An embodiment of one or more storage mediums include instructions for processing online transaction requests for an order management service to generate transaction records, the online transaction requests including at least a first type of transaction and a second type of transaction; accumulating the transaction records in a storage; automatically determining a batch size for application program interface (API) requests for the transaction records and a frequency rate for the API requests based at least in part on a throughput rate for the processed transaction requests; and process the API requests to the order management service.

24 Claims, 9 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,640,244 B1 * | 10/2003 | Bowman-Amuah ... G06F 9/466 707/999.01 |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0125362 A1 * | 6/2005 | Cheng .................. G06Q 20/401 705/75 |
| 2009/0177744 A1 | 7/2009 | Marlow et al. |
| 2017/0168959 A1 | 6/2017 | Dodonov et al. |
| 2018/0004801 A1 * | 1/2018 | Burchall ............. G06F 16/2336 |
| 2019/0018760 A1 * | 1/2019 | Webb .................. G06F 11/3452 |
| 2019/0114353 A1 * | 4/2019 | Harding, Jr. ...... G06F 16/24552 |

OTHER PUBLICATIONS

Non-Final Office Action for U.S. Appl. No. 16/378,374 dated Apr. 20, 2020, 10 pages.

Notice of Allowance for U.S. Appl. No. 16/378,374 dated Nov. 30, 2020, 9 pages.

* cited by examiner ically in the range of 10 to 1000+ order line items per order).

COMPOSITE BATCHING TO MANAGE THROUGHPUT FOR ONLINE COMMERCE APPLICATIONS

TECHNICAL FIELD

Embodiments relate to techniques for computer operations. More particularly, embodiments relate to composite batching to manage throughput for online commerce applications.

BACKGROUND

Online commerce continues to grow in volume and variety of sales. Online commerce is generally divided into commerce between businesses, referred to as Business-to-Business (B2B) commerce, and commerce between businesses, such as online stores, and individual consumers, referred to as Business-to-Consumer (B2C) commerce.

Many online operations serve both businesses and consumers, thus taking and servicing both B2B and B2C orders. However, B2B and B2C transactions can vary significantly from each other in terms of, for example, the content of individual orders and the average and peak load of such orders. Consumer transactions typically include a small number of items for each order, with the number of transactions varying greatly, with large peaks on certain days. In contrast, business transactions tend to include a larger number of items within each transaction, with the number of transactions being smaller and generally more stable than consumer. Further, there are certain transactions that do not conform with expected patterns.

For this reason, commerce applications (such as Order Management Services) present a great challenge to balance the varied transactions that are received to provide for a stable and scalable throughput under increasing order load and complexity.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
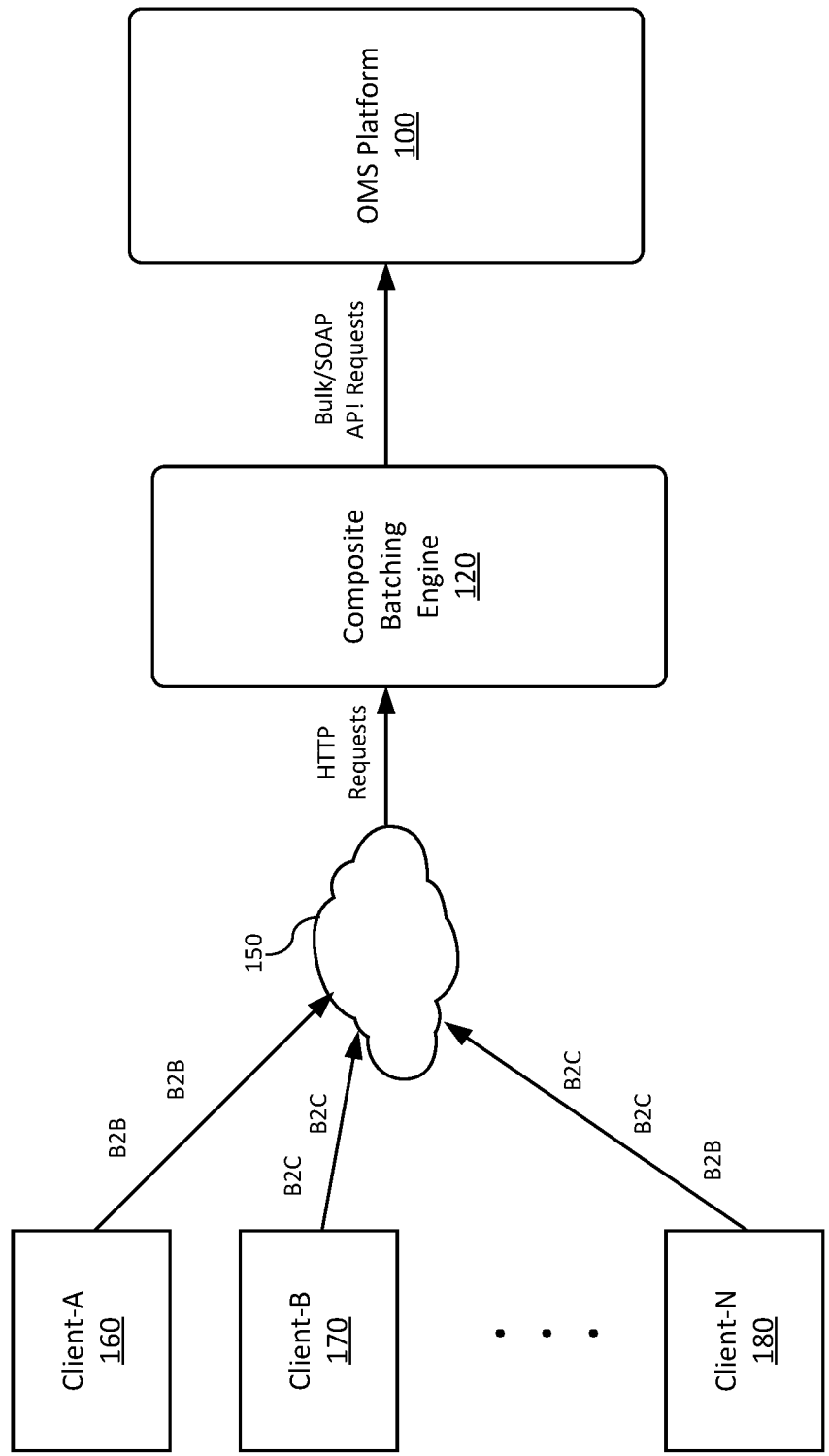
FIG. 1 is an illustration of composite batching to manage throughput for online commerce applications according to some embodiments.

In the following description, numerous specific details are set forth. However, embodiments may be practiced without these specific details. In other instances, well-known circuits, structures and techniques have not been shown in detail in order not to obscure the understanding of this description.

In some embodiments, an apparatus, system, or process is to provide for composite batching to manage throughput for online commerce applications.

In online commerce, clients may utilize an Order Management Service (OMS) (which may also be referred to as an Order Management System or other similar term) wherein the service provided by a server (which many include many physical servers) receives and processes orders from clients. An Order Management Service may include Salesforce Commerce Cloud. An order is an agreement between a company and a customer (which may be either a business or consumer) to provision services or deliver products, which will have a known quantity, price, and date. As used herein, a transaction includes one or more orders, and each order may include one or more line items. For example, Transaction-1 may include Order-1 (including one or more items), Order-2, and so on.

In Business-to-Consumer (B2C) commerce, a typical transaction contains single-digit orders per transaction (with typically 1-2 order line items per order). An average throughput for B2C commerce use-cases may be in the range of approximately 100 to 1,000 orders per minute (although this can vary in different businesses use cases). However, the peak throughput for B2C commerce use cases may be much higher, such as between 15,000 and 25,000 orders per minute, particularly for seasonal peaks (such as Black Friday and Cyber Monday).

In order to avoid order starvation in multi-tenant environments, API (Application Programming Interface) limits are commonly established for OMS transactions. Subject to license type, an organization may, for example, be allowed a maximum of 10K transaction records for each batch and a maximum of 10K batches per day. Orders may be expected to be ingested into the OMS in near real-time. At lower throughput, the limit on the number of batches per day may be exhausted, while at higher throughput the limit on the number of transaction records per batch may instead be exhausted.

In contrast with B2C operations, typical B2B commerce transactions contain multiple orders per transaction (typically in the range of 10 to 1000+ order line items per order). The average throughput for B2B commerce use cases may be, for example, less than 100 orders per minute, while peak throughput for B2B commerce use cases can be approximately 5K orders per minute.

In an OMS operation, due to the hierarchical structure of the orders in B2B use cases (for example, order products, order delivery, order line items, etc.), the number of transaction records per batch can be exhausted easily. However, the hierarchical structure of the order needs to be maintained even if individual records are distributed across batches.

In some embodiments, composite batching is provided to manage throughput for online commerce applications. An apparatus, system, or process enables dynamic maintenance of throughput for the Order Management Service under increasing load and complexity by applying a composite batching methodology while maintaining the trade-off between the established limits and time constraints.

FIG. 1 is an illustration of composite batching to manage throughput for online commerce applications according to some embodiments. As shown in FIG. 1, an Order Management Service (OMS) Platform 100 (which may include any number of physical servers in a system) to process online transactions for a number of requestors, with the requestors being illustrated as Client-A 160, Client-B 170, and continuing through Client-N 180, where N may be any number of clients that are served by the Order Management Service 100. As illustrated, the clients 160-180 may communicate transactions via network, such as the illustrated Internet 150. The transactions may be a mix of online transactions, which are illustrated as B2C and B2B transactions (in general, including a first type of transaction and a second type of transaction) from any of the requestors.

In some embodiments, the transactions are received (such as the illustrated HTTP request) at a composite batching engine 120, the composite batching engine 120 providing servicing for each of the online transactions, thus including both B2C and B2B transactions.

In some embodiments, the composite batching engine 120 is to manage the throughput of the online requests, and deliver the requests in multiple API formats to the OMS platform 100 based on the throughput levels. This is illustrated in FIG. 1 as the delivery of Bulk API for high throughput orders (such as a number of transaction records above a particular threshold) and SOAP API requests for low throughput orders (such as a number of transaction records below the threshold). However, embodiments are not limited to this particular implementation, and may include different or additional APIs.

Figure 2:
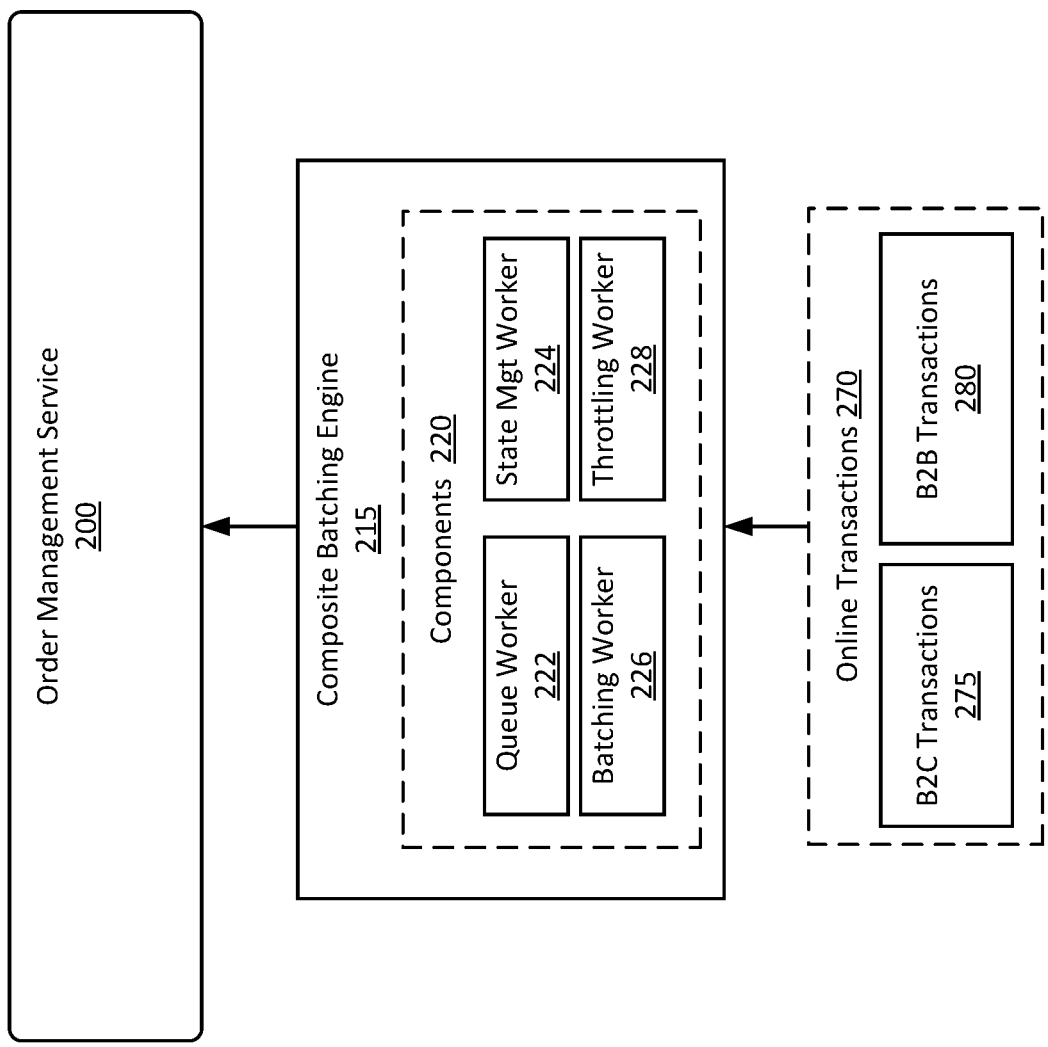
FIG. 2 is an illustration of a composite batching engine to manage throughput for online commerce applications according to some embodiments.

FIG. 2 is an illustration of a composite batching engine to manage throughput for online commerce applications according to some embodiments. In some embodiments, an Order Management Service 200 includes a composite batching engine 215 to consume all incoming online commerce transactions 270 (including both B2C transactions 275 and B2C transactions 280) transactions.

In some embodiments, a composite batching service includes:

(a) Queue Worker 222—A worker (i.e., a worker object) defined for queuing all incoming requests for initial processing to parse the order hierarchy (business object to records mapping).

(b) State Management Worker 224—A worker defined for managing the state (atomicity) of the transaction, with multiple workers available to dequeue and process incoming requests.

(c) Batching Worker 226—A worker defined to manage the batching of processed requests at optimal throughput, with multiple workers available to simultaneously process stateless requests.

(d) Throttling Worker 228—A worker defined for dynamic throttling of batches based on resource limitations.

Figure 3:
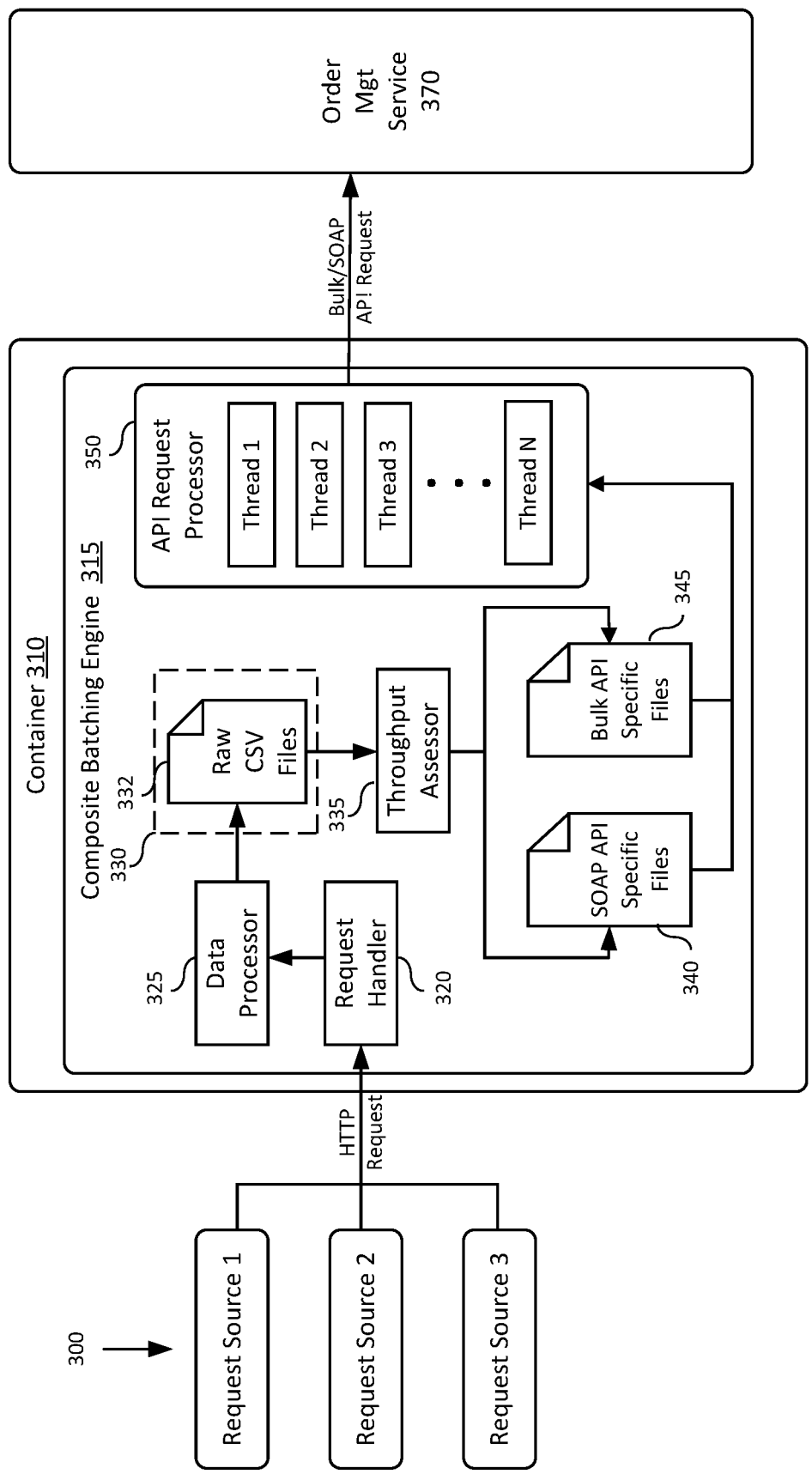
FIG. 3 is an illustration of architecture of a composite batching engine for online commerce applications according to some embodiments.

FIG. 3 is an illustration of architecture of a composite batching engine for online commerce applications according to some embodiments. In some embodiments, an Order Management Service runs in a multi-tenant environment and accepts HTTP requests from multiple customers and sources (B2B and B2C Commerce Applications), illustrated in FIG. 3 as multiple request sources 300 designated as Request Source 1, Request Source 2, and Request Source 3. Incoming requests are handled by a web controller (request handler 320) that ensures a valid authentication to the OMS platform, as well as correctness of the request endpoint, format, and parameters. Invalid requests and errors may be gracefully handled and will return standard HTTP status codes.

In some embodiments, a data processor 325 validates the data format (e.g. CSV (Comma-Separated Values), XML (Extensible Markup Language), JSON (JavaScript Object Notation), etc.) of the incoming requests and accumulates the transaction records 332 (denoted as raw CSV files) into a temporary storage 330 (e.g. file, queue, database, etc.). The data processor 325 maintains object hierarchies, relationships, and UID (User ID, or other unique identifier) dependencies. Due to the hierarchical structure of the orders in B2B use cases (e.g. order, order items, order delivery, etc.) transaction records are distributed and created in different API requests to the OMS platform.

In some embodiments, a throughput accessor 335 identifies low and high throughput sequences (in general, identifying which of multiple throughput levels a sequence of transactions falls within) by continuously monitoring the incoming HTTP requests and processed data. The throughput accessor 335 dynamically throttles API requests to the OMS platform based on resource limitations, and determines the appropriate batch size to optimize trade-offs between the established API limits and time constraints.

In some embodiments, the API requests to the OMS platform are processed in parallel by a pool of worker threads of an API request processor 350 using the SOAP (Simple Object Access Protocol) API or REST (Representational State Transfer) Bulk API depending on a low and high throughput situation, shown as SOAP API specific files 340 and Bulk API specific files 345. The data processor 325 will use the returned UIDs to solve all dependencies and execute the next batch of transaction records in the hierarchy.

In some embodiments, a composite batching engine handles multiple complexities (simple and hierarchical) and loads (from low to high throughput) in received online transactions. In hierarchical entity scenarios, the object hierarchies, relationships, and UID dependencies are required to be maintained in the transaction processing. In high load scenarios, API requests to the OMS platform are handled in bulk (supporting more than one request) to optimize data loading. In the case of simple entity complexity (such as the B2C use case) the service receives orders only.

Figure 4:
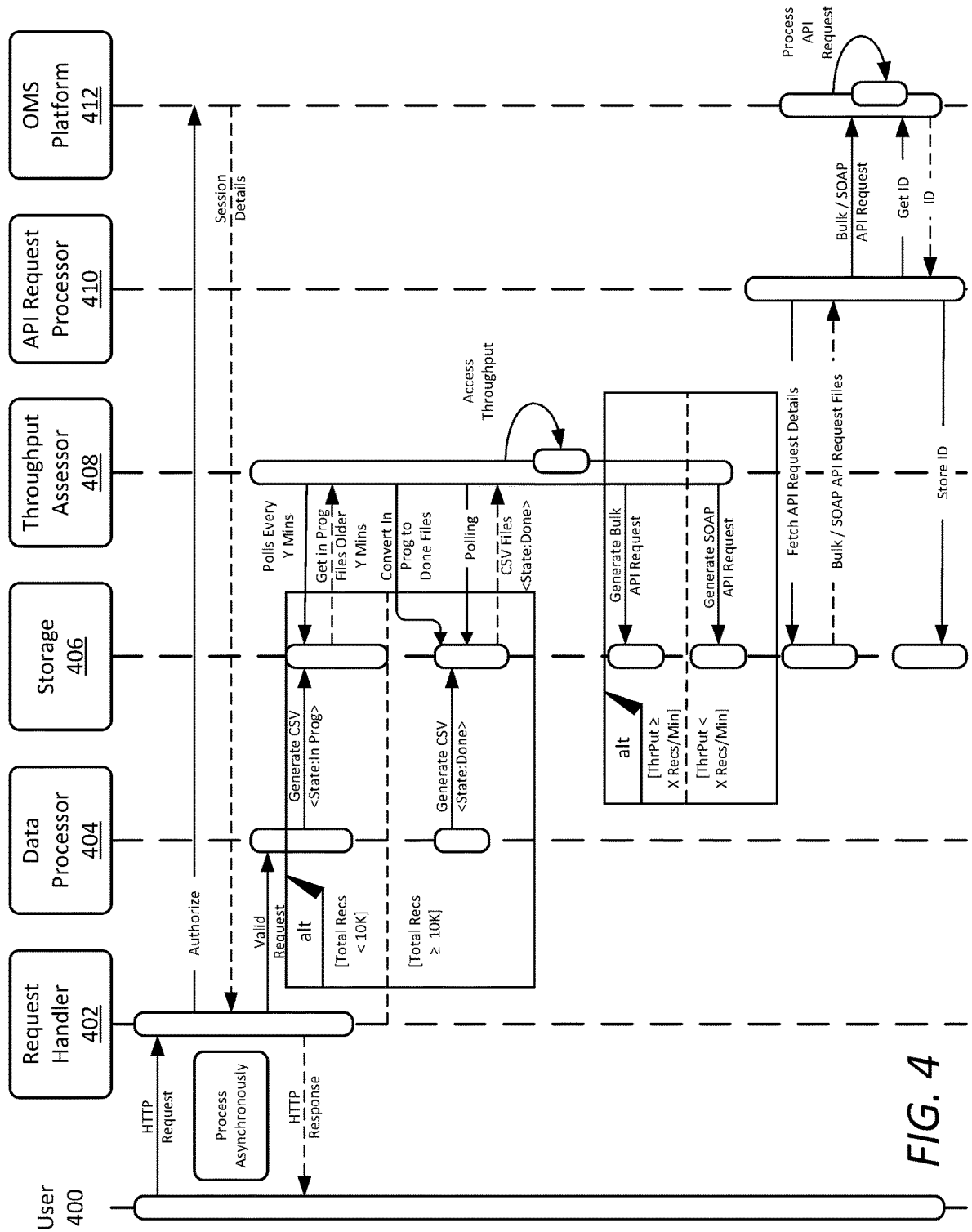
FIG. 4 is a sequence diagram to illustrate a single entity sample case for a composite batching engine according to some embodiments.

FIG. 4 is a sequence diagram to illustrate a single entity sample case for a composite batching engine according to some embodiments. As illustrated in FIG. 4, the illustrated message flow in the sequence diagram is between a user 400 (which in general may be a request source 300 as illustrated in FIG. 3), a request handler 402 (such as request handler 320 illustrated in FIG. 3), a data processor 404 (such as data processor 325 illustrated in FIG. 3), a storage 406 (such as temporary storage 330 illustrated in FIG. 3), throughput accessor 408 (such as throughput accessor 335 illustrated in FIG. 3), an API request processor 410 (such as API request processor 350 illustrated in FIG. 3), and an Order Management Service (OMS) platform 412 (such as Order Management Service 370 illustrated in FIG. 3 or Order Management Service 200 illustrated in FIG. 2).

In the exemplary process provided in FIG. 4, the incoming HTTP request bodies contain order definitions. The request handler 402 is to ensure the authentications, endpoints and other required parameters are valid. Authorized request then proceed in processing, while unauthorized/invalid requests will, for example, return 5XX HTTP status codes.

The data processor 404 is to parse the request bodies and ensure that the expected formats are respected (e.g. CSV, XML, JSON, etc.). In a particular implementation, the valid order definitions are stored into a temporary .spill text file in storage 406, wherein the filename contains the object type as well as a UNIX timestamp (e.g. tmp_order_1541015621998.csv.spill). The data processor 404 is to accumulate incoming order definitions into the existing .spill file. If no .spill file exists it will create one.

Proceeding in the sample case illustrated in FIG. 4, the throughput accessor 408 is to determine an optimal batch size and optimal API request frequency rate based on the rate of incoming HTTP requests and the processed orders.

In a low throughput scenario, an API request from the API request processor 410 to the OMS Platform is made every X minutes (i.e., the determination is based on expiration of a time period). When the time difference between the file UNIX timestamp and current time exceeds X minutes, the file is renamed with a .soap extension (e.g. tmp_order_1541015621998.csv.soap).

In a high throughput scenario, an API request to the OMS Platform is made when the number of accumulated orders reaches X number (i.e., the determination is made based on a number of accumulated order). When the order limit is reached, the .spill file is renamed with a .bulk extension (e.g. tmp_order_1541015621998.csv.bulk)

Worker threads are continually waiting at the API request processor 410 for files with a .soap or .bulk extensions to be created. Once picked up by a thread, files are renamed with a .progress extension to ensure no other thread picks them up (e.g. tmp_order_1541015621998.csv.soap.progress). The worker threads build the API requests and send them to the OMS Platform 412 using the SOAP or REST Bulk protocol based on the file extensions. The API returns the UIDs of the created orders and stores them into temporary text files with a .ids extension (e.g. tmp_order_1541015621998.csv.soap.ids).

Figure 5:
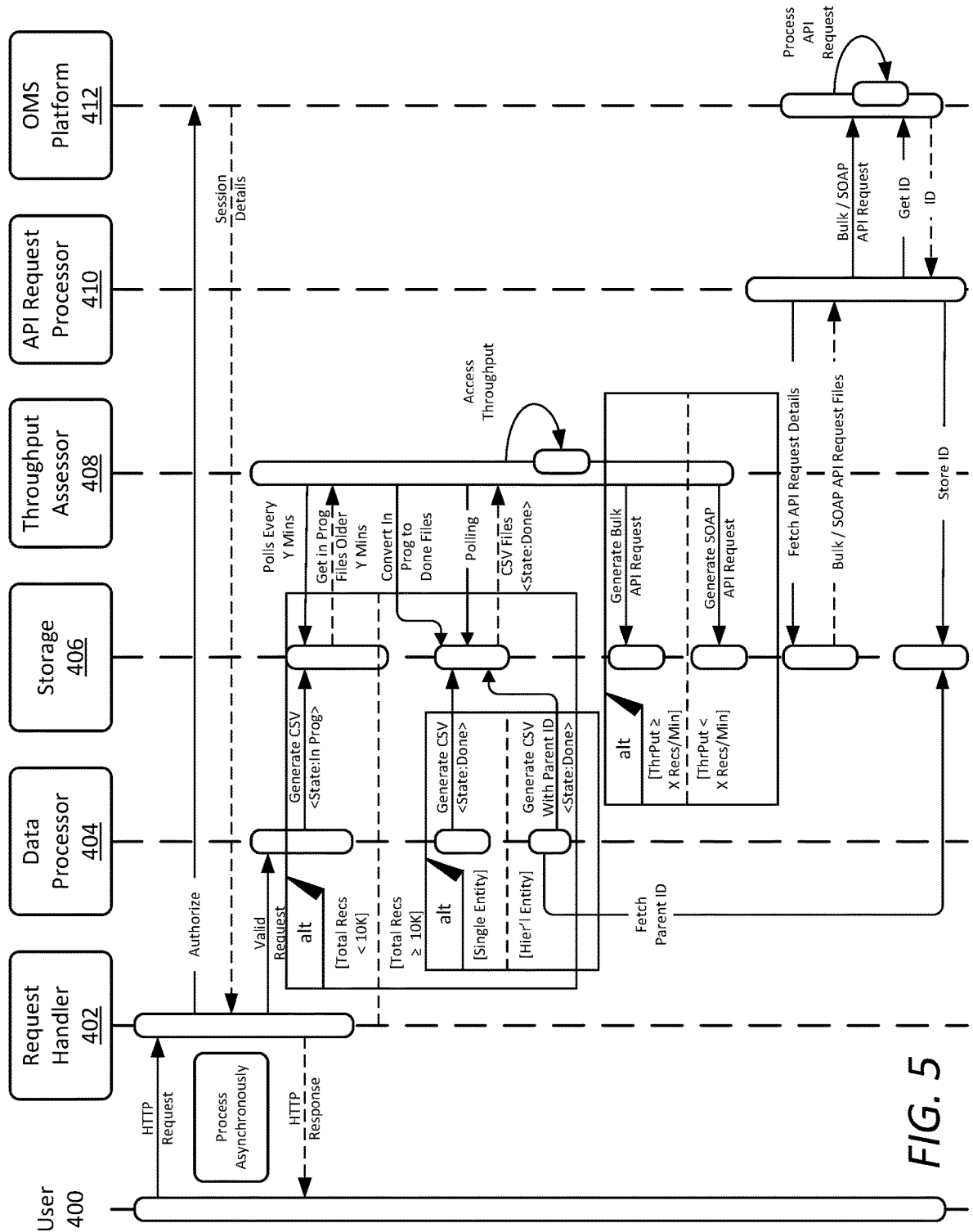
FIG. 5 is a sequence diagram to illustrate a sample hierarchical entities use case for a composite batching engine according to some processes.

FIG. 5 is a sequence diagram to illustrate a sample hierarchical entities use case for a composite batching engine according to some processes. As illustrated in FIG. 5, the illustrated message flow in the sequence diagram is again between a user 400, a request handler 402, a data processor 404, a storage 406, a throughput accessor 408, an API request processor 410, and an OMS platform 412.

In the case of hierarchical entities complexity (i.e., B2B use-case) the service receives orders, order items, order deliveries, etc. The service needs to maintain the object hierarchies and relationship dependencies. e.g. an order item cannot be created before an order. To create an order item, the order UID is required.

In operation, the flow and logic for the hierarchical use case in FIG. 4 are similar to the simple entity use case in most aspects. The data processor 404 parses the request bodies and distributes the transaction records into .spill files for each object types. Due to the hierarchical structure of the orders in B2B use cases, transaction records are distributed and created in different API requests to the OMS Platform.

Worker threads are waiting for all parent UIDs to be available into the .ids files before picking up an object with dependencies or relationships, for example, unless the orders are created and the UIDs are available into the .ids file the order item temporary text file retains the .soap or .bulk extension.

Figure 6:
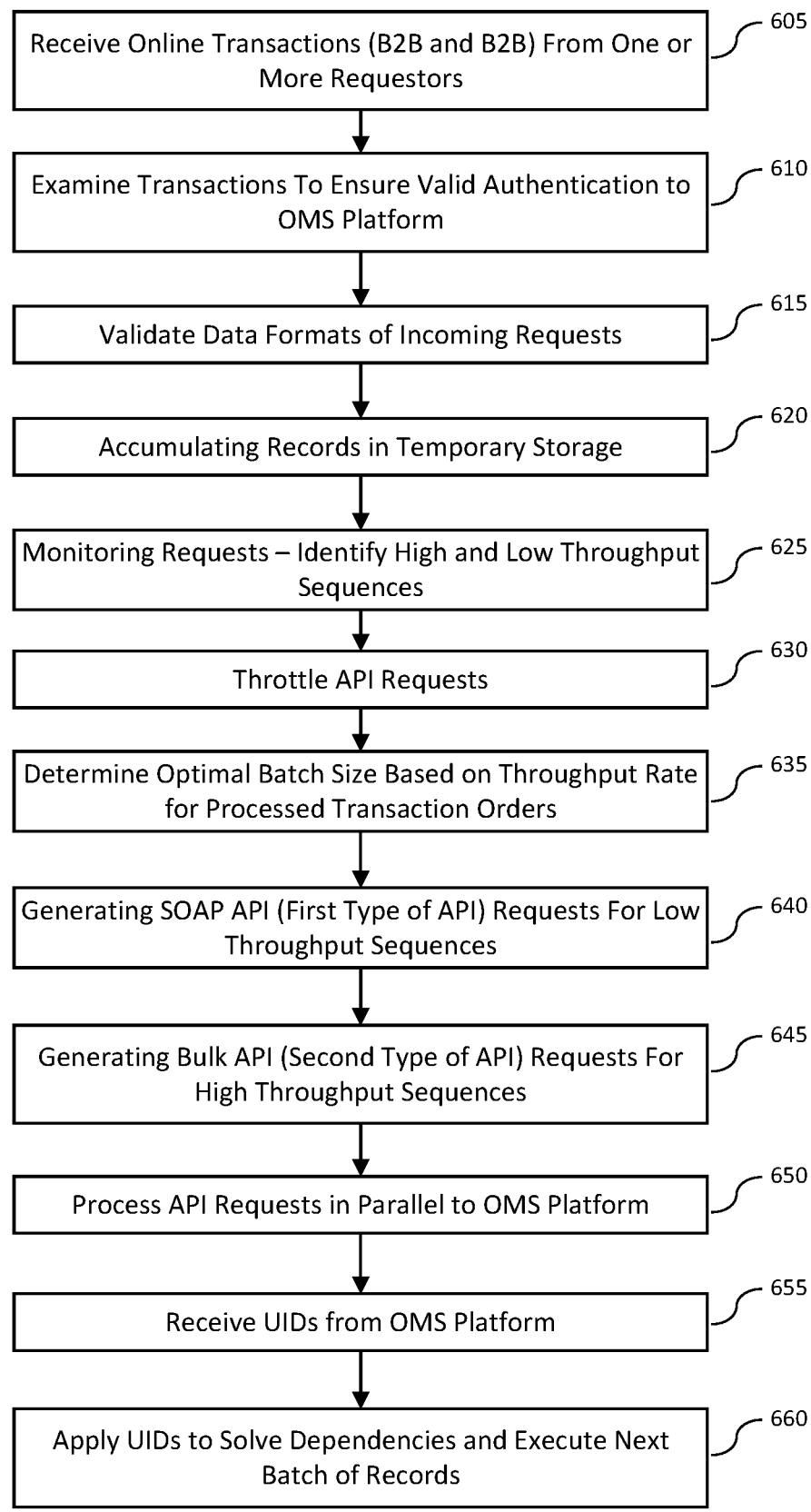
FIG. 6 is a flowchart to illustrate a process for composite batching of transactions for an Order Management Service (OMS) according to some embodiments.

FIG. 6 is a flowchart to illustrate a process for composite batching of transactions for an Order Management Service (OMS) according to some embodiments. As illustrated in FIG. 6, a process includes receiving online transactions (which may include both B2C and B2B transactions) from one or more request sources 605 and examining the received transactions to ensure a valid authentication to the OMS platform 610, as well as correctness of the request endpoint, format, and parameters. The process further includes validating the data formats of the incoming requests 615, and accumulating the received transaction records into a temporary storage 620, while maintaining object hierarchies, relationships, and UID dependencies of the transactions.

The process continues with monitoring incoming HTTP requests and process data to identify high and low throughput rates 625, and throttling API requests to the OMS platform based on resource limitations 630 and determining an optimal batch size based at least in part on a throughput rate for processed transaction orders 635. The process further includes generating SOAP API requests (a first type of API request) for low throughput sequences 640 and generating Bulk API requests (a second type of API request) for high throughput sequences 645, and processing the generated API requests to the OMS platform in parallel by a pool of worker threads 650. UIDs are received from the 655 and the UIDs are applied to solve dependencies and execute a next batch of transaction records in the hierarchy 660. The process then continues with reception and processing of requests.

Figure 7:
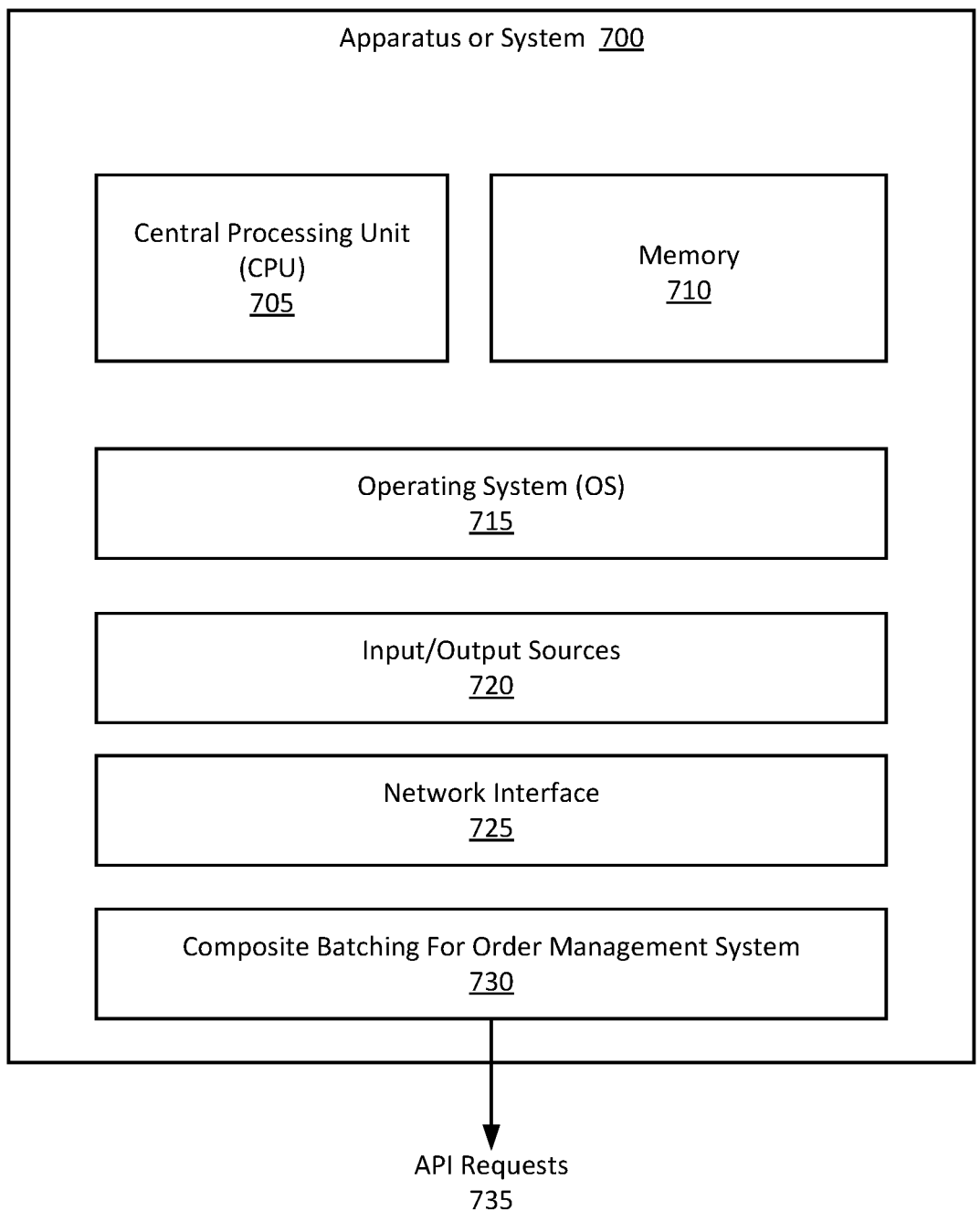
FIG. 7 illustrates an apparatus or system including a composite batching engine to manage throughput for online commerce applications according to some embodiments.

FIG. 7 illustrates an apparatus or system including a composite batching engine to manage throughput for online commerce applications according to some embodiments. Apparatus or system 700 represents a communication and data processing device including but not limited to a computer, server, or other apparatus or system.

Further, for example, apparatus or system 700 may include a computer platform hosting an integrated circuit ("IC"), such as a system on a chip ("SoC" or "SOC"), integrating various hardware and/or software components of apparatus or system 700 on a single chip.

As illustrated, in one embodiment, apparatus or system 700 may include, but is not limited to, one or more processors including a central processing unit 705 ("CPU" or simply "application processor") or other main processing unit, memory 710, network devices, drivers, or the like, as well as input/output (IO) sources 720, such as touchscreens, touch panels, touch pads, virtual or regular keyboards, virtual or regular mice, ports, connectors, etc. Apparatus or system 700 may include an operating system (OS) 715 serving as an interface between hardware and/or physical resources of apparatus or system 700 and a user. In some embodiments, the apparatus or system 700 further includes a network interface 725 for transmission and receiving of data, including receipt of heterogeneous online transaction requests (such as both B2C and B2B transactions).

It is to be appreciated that a lesser or more equipped system than the example described above may be preferred for certain implementations. Therefore, the configuration of apparatus or system 700 may vary from implementation to implementation depending upon numerous factors, such as price constraints, performance requirements, technological improvements, or other circumstances.

Embodiments may be implemented as any or a combination of: one or more microchips or integrated circuits interconnected using a system board, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

In some embodiments, the apparatus or system 700 includes composite batching for an Order Management System 730, including the processing of the online transaction requests. The processing is to result in the generation of API requests 735 for the Order Management System, which may include a first type of API request for a low throughput sequences and a second type of API request for a high throughput sequence.

Apparatus or system 700 may host network interface(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), 5th Generation (5G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

The examples illustrating the use of technology disclosed herein should not be taken as limiting or preferred. The examples are intended to sufficiently illustrate the technology disclosed without being overly complicated and are not intended to illustrate all of the technologies disclosed. A person having ordinary skill in the art will appreciate that there are many potential applications for one or more implementations of this disclosure and hence, the implementations disclosed herein are not intended to limit this disclosure in any fashion.

One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Implementations may include:

In some embodiments, one or more non-transitory computer-readable storage mediums have stored thereon executable computer program instructions that, when executed by one or more processors, cause the one or more processors to perform operations including processing a plurality of online transaction requests for an order management service to generate transaction records, the online transaction requests including at least a first type of transaction and a second type of transaction; accumulating the transaction records in a storage; automatically determining a batch size for application program interface (API) requests for the transaction records and a frequency rate for the API requests based at least in part on a throughput rate for the transaction records; and process the API requests to the order management service.

In some embodiments, the first type of transaction is a Business-to-Consumer (B2C) transaction and the second type of transaction is a Business-to-Business (B2B) transaction.

In some embodiments, the instructions further include validating authentication to the order management service and validating data formats of the plurality of online transaction requests.

In some embodiments, the instructions further include dynamically throttling the API requests for the transaction records based on one or more resource limitations.

In some embodiments, the instructions further include identifying a throughput rate for one or more sequences of transaction records, the throughput rate being one of a low throughput or a high throughput; and utilizing a first API for an API request if a sequence of transaction records has a low throughput and utilizing a second API if the sequence of transaction records has a high throughput.

In some embodiments, a sequence of transaction records has a low throughput if a total number of transaction records accumulated in a specified time period is less than a threshold, and the sequence of transaction records has a high throughput if the total number of transaction records in the specified time period is greater than or equal to the threshold.

In some embodiments, the first API is a SOAP (Simple Object Access Protocol) API and the second API is a REST (Representational State Transfer) Bulk API.

In some embodiments, processing the API requests to the order management service includes processing the API requests in parallel by a pool of worker threads.

In some embodiments, processing the plurality of online transaction requests includes maintaining object hierarchies, relationships, and dependencies for any of the plurality of online transaction requests.

In some embodiments, maintaining object hierarchies, relationships, and dependencies includes receiving identifications from the order management service and applying the received identifications for following transaction records.

In some embodiments, a system includes one or more processors; a data storage to store data, including data for online transaction requests; and a network interface to receive the online transaction requests for an order management service, wherein the system is to process a plurality of online transaction requests for the order management service to generate transaction records, the online transaction requests including at least a first type of transaction and a second type of transaction; accumulate the transaction records in a storage; automatically determining a batch size for application program interface (API) requests for the transaction records and a frequency rate for the API requests based at least in part on a throughput rate for the transaction records; and process the API requests to the order management service.

In some embodiments, the first type of transaction is a Business-to-Consumer (B2C) transaction and the second type of transaction is a Business-to-Business (B2B) transaction.

In some embodiments, the system is further to validate authentication to the order management service and validate data formats of the plurality of online transaction requests.

In some embodiments, the system is further to dynamically throttle the API requests for the transaction records based on one or more resource limitations.

In some embodiments, the system is further to identify a throughput rate for one or more sequences of transaction records, the throughput rate being one of a low throughput or a high throughput; and utilize a first API for an API request if a sequence of transaction records has a low throughput and utilize a second API if the sequence of transaction records has a high throughput.

In some embodiments, a sequence of transaction records has a low throughput if a total number of transaction records accumulated in a specified time period is less than a threshold, and the sequence of transaction records has a high throughput if the total number of transaction records in the specified time period is greater than or equal to the threshold.

In some embodiments, the first API is a SOAP (Simple Object Access Protocol) API and the second API is a REST (Representational State Transfer) Bulk API.

In some embodiments, processing the plurality of online transaction requests includes the system to maintain object hierarchies, relationships, and dependencies for any of the plurality of online transaction requests.

In some embodiments, maintaining object hierarchies, relationships, and dependencies includes the system to receive identifications from the order management service and apply the received identifications for following transaction records.

In some embodiments, a method includes processing a plurality of online transaction requests for an order management service to generate transaction records, the online transaction requests including one or more Business-to-Consumer (B2C) transactions and one or more Business-to-Business (B2B) transactions; accumulating the transaction records in a storage; automatically determining a batch size for application program interface (API) requests for the transaction records and a frequency rate for the API requests based at least in part on a throughput rate for the transaction records; and process the API requests to the order management service.

In some embodiments, the first type of transaction is a Business-to-Consumer (B2C) transaction and the second type of transaction is a Business-to-Business (B2B) transaction.

In some embodiments, the method further includes dynamically throttling the API requests for the transaction records based on one or more resource limitations.

In some embodiments, the method further includes identifying a throughput rate for one or more sequences of transaction records, the throughput rate being one of a low throughput or a high throughput; and utilizing a first API for an API request if a sequence of transaction records has a low throughput and utilizing a second API if the sequence of transaction records has a high throughput.

In some embodiments, a sequence of transaction records has a low throughput if a total number of transaction records accumulated in a specified time period is less than a threshold, and the sequence of transaction records has a high throughput if the total number of transaction records in the specified time period is greater than or equal to the threshold.

In some embodiments, the first API is a SOAP (Simple Object Access Protocol) API and the second API is a REST (Representational State Transfer) Bulk API.

In some embodiments, processing the plurality of online transaction requests includes maintaining object hierarchies, relationships, and dependencies for any of the plurality of online transaction requests.

In some embodiments, maintaining object hierarchies, relationships, and dependencies includes receiving identifications from the order management service and applying the received identifications for following transaction records.

Figure 8:
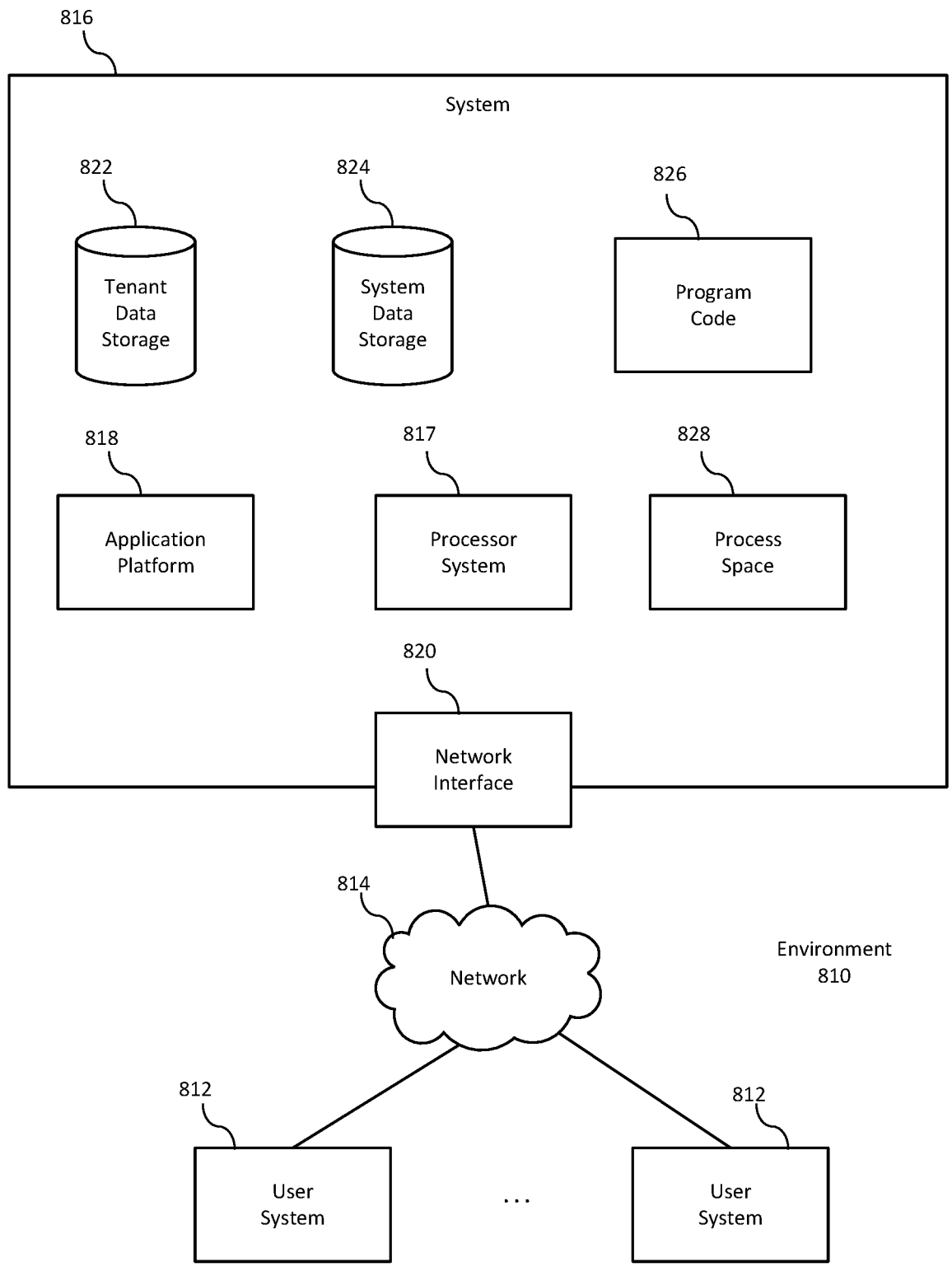
FIG. 8 illustrates a block diagram of an environment in which composite batching of transactions may be provided.

FIG. 8 illustrates a block diagram of an environment in which composite batching of transactions may be provided. In some embodiments, the environment 810 includes composite batching of transactions as illustrated in FIGS. 1-7. The environment 810 may include user systems 812, network 814, system 816, processor system 817, application platform 818, network interface 820, tenant data storage 822, system data storage 824, program code 826, and process space 828. In other embodiments, environment 810 may not have all of the components listed and/or may have other elements instead of, or in addition to, those listed above.

Environment 810 is an environment in which an on-demand database service exists. User system 812 may be any machine or system that is used by a user to access a database user system. For example, any of user systems 812 can be a handheld computing device, a smart phone, a laptop or tablet computer, a work station, and/or a network of computing devices. As illustrated in herein FIG. 8 and in more detail in FIG. 8, user systems 812 may interact via a network 814 with an on-demand database service, such as system 816.

An on-demand database service, such as system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 816" and "system 816" may be used interchangeably herein. A database image may include one or more database objects. A relational database management system (RDMS) or the equivalent may execute storage and retrieval of information against the database object(s). Application platform 818 may be a framework that allows the applications of system 816 to run, such as the hardware and/or software, e.g., the operating system. In an embodiment, on-demand database service 816 may include an application platform 818 that enables creation, managing and executing one or more applications developed by the provider of the on-demand database service, users accessing the on-demand database service via user systems 812, or third-party application developers accessing the on-demand database service via user systems 812.

The users of user systems 812 may differ in their respective capacities, and the capacity of a particular user system 812 might be entirely determined by permissions (permission levels) for the current user. For example, where a salesperson is using a particular user system 812 to interact with system 816, that user system has the capacities allotted to that salesperson. However, while an administrator is using that user system to interact with system 816, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 814 is any network or combination of networks of devices that communicate with one another. For example, network 814 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 812 might communicate with system 816 using TCP/IP and, at a higher network level, use other common Internet protocols to communicate, such as HTTP, FTP, AFS, WAP, etc. In an example where HTTP is used, user system 812 might include an HTTP client commonly referred to as a "browser" for sending and receiving HTTP messages to and from an HTTP server at system 816. Such an HTTP server might be implemented as the sole network interface between system 816 and network 814, but other techniques might be used as well or instead. In some implementations, the interface between system 816 and network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 816, shown in FIG. 8, implements a web-based customer relationship management (CRM) system. For example, in one embodiment, system 816 includes application servers configured to implement and execute CRM software applications as well as provide related data, code, forms, webpages and other information to and from user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 816 implements applications other than, or in addition to, a CRM application. For example, system 816 may provide tenant access to multiple hosted (standard and custom) applications, including a CRM application. User (or third-party developer) applications, which may or may not include CRM, may be supported by the application platform 818, which manages creation, storage of the applications into one or more database objects and executing of the applications in a virtual machine in the process space of the system 816.

One arrangement for elements of system 816 is shown in FIG. 8, including a network interface 820, application platform 818, tenant data storage 822 for tenant data 823, system data storage 824 for system data 825 accessible to system 816 and possibly multiple tenants, program code 826 for implementing various functions of system 816, and a process space 828 for executing MTS system processes and tenant-specific processes, such as running applications as part of an application hosting service. Additional processes that may execute on system 816 include database indexing processes.

Several elements in the system shown in FIG. 8 include conventional, well-known elements that are explained only briefly here. For example, each user system 812 could include a desktop personal computer, workstation, laptop or tablet computer, smart phone, or any wireless access protocol (WAP) enabled device or any other computing device capable of interfacing directly or indirectly to the Internet or other network connection. User system 812 typically runs an HTTP client, e.g., a browsing program (also referred to as a web browser or browser), such as Edge or Internet Explorer from Microsoft, Safari from Apple, Chrome from Google, Firefox from Mozilla, or a WAP-enabled browser in the case of a smart phone or other wireless device, or the like, allowing a user (e.g., subscriber of the multi-tenant database system) of user system 812 to access, process and view information, pages and applications available to it from system 816 over network 814. Each user system 812 also typically includes one or more user interface devices, such as a keyboard, a mouse, touch pad, touch screen, pen, voice interface, gesture recognition interface, or the like, for interacting with a graphical user interface (GUI) provided by the browser on a display (e.g., a monitor screen, LCD display, etc.) in conjunction with pages, forms, applications and other information provided by system 816 or other systems or servers. For example, the user interface device can be used to access data and applications hosted by system 816, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 812 and all of its components are operator configurable using applications, such as a browser, including computer code run using a central processing unit such as an Intel Core series processor or the like. Similarly, system 816 (and additional instances of an MTS, where more than one is present) and all of their components might be operator configurable using application(s) including computer code to run using a central processing unit such as processor system 817, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 816 to intercommunicate and to process webpages, applications and other data and media content as described herein are preferably downloaded and stored on a hard disk or solid state drive (SSD), but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.)

using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 816 is configured to provide webpages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 9:
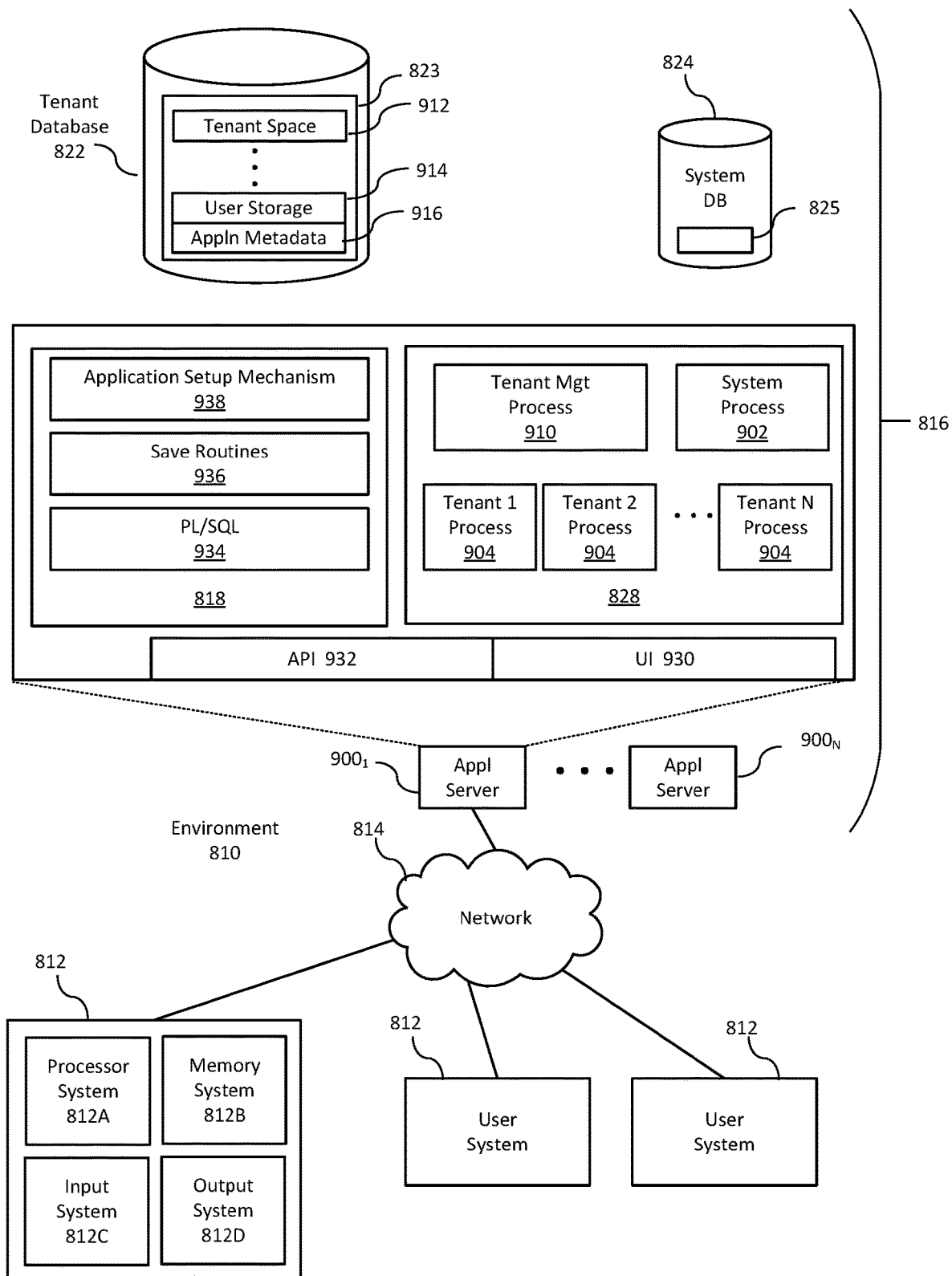
FIG. 9 illustrates further details of an environment in which composite batching of transactions may be provided.

FIG. 9 illustrates further details of an environment in which composite batching of transactions may be provided. FIG. 9 provides further detail regarding elements of system 816. In addition, various interconnections in an embodiment are provided. FIG. 9 shows that user system 812 may include processor system 812A, memory system 812B, input system 812C, and output system 812D. FIG. 9 shows network 814 and system 816. FIG. 9 also shows that system 816 may include tenant data storage 822, tenant data 823, system data storage 824, system data 825, User Interface (UI) 930, Application Program Interface (API) 932, PL/SOQL 934, save routines 936, application setup mechanism 938, applications servers $900_1$-$900_N$, system process space 902, tenant process spaces 904, tenant management process space 910, tenant storage area 912, user storage 914, and application metadata 916. In other embodiments, environment 810 may not have the same elements as those listed above and/or may have other elements instead of, or in addition to, those listed above.

User system 812, network 814, system 816, tenant data storage 822, and system data storage 824 were discussed above in FIG. 8. Regarding user system 812, processor system 812A may be any combination of one or more processors. Memory system 812B may be any combination of one or more memory devices, short term, and/or long-term memory. Input system 812C may be any combination of input devices, such as one or more keyboards, mice, trackballs, scanners, cameras, and/or interfaces to networks. Output system 812D may be any combination of output devices, such as one or more monitors, printers, and/or interfaces to networks. As shown by FIG. 9, system 816 may include a network interface 820 (of FIG. 8) implemented as a set of HTTP application servers 900, an application platform 818, tenant data storage 822, and system data storage 824. Also shown is system process space 902, including individual tenant process spaces 904 and a tenant management process space 910. Each application server 900 may be configured to tenant data storage 822 and the tenant data 823 therein, and system data storage 824 and the system data 825 therein to serve requests of user systems 812. The tenant data 823 might be divided into individual tenant storage areas 912, which can be either a physical arrangement and/or a logical arrangement of data. Within each tenant storage area 912, user storage 914 and application metadata 916 might be similarly allocated for each user. For example, a copy of a user's most recently used (MRU) items might be stored to user storage 914. Similarly, a copy of MRU items for an entire organization that is a tenant might be stored to tenant storage area 912. A UI 930 provides a user interface and an API 932 provides an application programmer interface to system 816 resident processes to users and/or developers at user systems 812. The tenant data and the system data may be stored in various databases, such as one or more Oracle™ databases.

Application platform 818 includes an application setup mechanism 938 that supports application developers' creation and management of applications, which may be saved as metadata into tenant data storage 822 by save routines 936 for execution by subscribers as one or more tenant process spaces 904 managed by tenant management process 910 for example. Invocations to such applications may be coded using PL/SOQL 934 that provides a programming language style interface extension to API 932. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 916 for the subscriber making the invocation and executing the metadata as an application in a virtual machine.

Each application server 900 may be communicably coupled to database systems, e.g., having access to system data 825 and tenant data 823, via a different network connection. For example, one application server $900_1$ might be coupled via the network 814 (e.g., the Internet), another application server $900_{N-1}$ might be coupled via a direct network link, and another application server $900_N$ might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 BIG-IP load balancer) is communicably coupled between the application servers 900 and the user systems 812 to distribute requests to the application servers 900. In one embodiment, the load balancer uses a least connections algorithm to route user requests to the application servers 900. Other examples of load balancing algorithms, such as round robin and observed response time, also can be used. For example, in certain embodiments, three consecutive requests from the same user could hit three different application servers 900, and three requests from different users could hit the same application server 900. In this manner, system 816 is multi-tenant, wherein system 816 handles storage of, and access to, different objects, data and applications across disparate users and organizations.

As an example of storage, one tenant might be a company that employs a sales force where each salesperson uses system 816 to manage their sales process. Thus, a user might maintain contact data, leads data, customer follow-up data, performance data, goals and progress data, etc., all applicable to that user's personal sales process (e.g., in tenant data storage 822). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 816 might also maintain system level data usable by multiple tenants or other data. Such system level data might include industry reports, news, postings, and the like that are sharable among tenants.

In certain embodiments, user systems 812 (which may be client systems) communicate with application servers 900 to request and update system-level and tenant-level data from system 816 that may require sending one or more queries to tenant data storage 822 and/or system data storage 824. System 816 (e.g., an application server 900 in system 816) automatically generates one or more SQL statements (e.g., one or more SQL queries) that are designed to access the desired information. System data storage 824 may generate query plans to access the requested data from the database.

Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, with U.S. Patent granted U.S. Pat. No. 7,779,039, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Embodiments may be provided, for example, as a computer program product which may include one or more machine-readable media (including a non-transitory machine-readable or computer-readable storage medium) having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic tape, magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

While concepts been described in terms of several embodiments, those skilled in the art will recognize that embodiments not limited to the embodiments described but can be practiced with modification and alteration within the spirit and scope of the appended claims. The description is thus to be regarded as illustrative instead of limiting.

What is claimed is:

1. One or more non-transitory computer-readable storage mediums having stored thereon executable computer program instructions that, when executed by one or more processors, cause the one or more processors to perform operations comprising:
    processing a plurality of online transaction requests for an order management service to generate transaction records, the online transaction requests including at least a first type of commerce transaction and a second, different type of commerce transaction;
    accumulating the processed transaction records in a storage;
    determining throughput rates for processing of one or more sequences of the transaction records;
    generating application program interface (API) requests for the one or more sequences of transaction records, including automatically selecting a type of API request and determining a batch size and a frequency rate for the API requests based at least in part on the determined throughput rates for the one or more sequences of transaction records; and
    processing the generated API requests to the order management service according to the determined batch size and frequency rate.

2. The one or more storage mediums of claim 1, wherein the first type of commerce transaction is a Business-to-Consumer (B2C) transaction and the second type of commerce transaction is a Business-to-Business (B2B) transaction.

3. The one or more storage mediums of claim 1, wherein the executable computer program instructions further include instructions for:
    validating authentication to the order management service and validating data formats of the plurality of online transaction requests, including validating data formats for the first type of commerce transaction and a second type of commerce transaction.

4. The one or more storage mediums of claim 1, wherein the executable computer program instructions further include instructions for:
    dynamically throttling the accumulated API requests for the transaction records based on one or more resource limitations.

5. The one or more storage mediums of claim 1, wherein:
    determining throughput rates for processing of the one or more sequences of transaction records includes determining the throughput rate as being one of a low throughput or a high throughput; and
    the executable computer program instructions further include instructions for:
    utilizing a first type of API request if a sequence of transaction records has a low throughput and utilizing a second type of API request if the sequence of transaction records has a high throughput.

6. The one or more storage mediums of claim 5, wherein a sequence of transaction records has a low throughput if a total number of transaction records accumulated in a specified time period is less than a threshold, and the sequence of transaction records has a high throughput if the total number of transaction records accumulated in the specified time period is greater than or equal to the threshold.

7. The one or more storage mediums of claim 5, wherein the first type of API request is a SOAP (Simple Object Access Protocol) API request and the second type of API is a REST (Representational State Transfer) Bulk API request.

8. The one or more storage mediums of claim 1, wherein processing the generated API requests to the order management service includes processing the API requests in parallel by a pool of worker threads.

9. The one or more storage mediums of claim 1, wherein processing the plurality of online transaction requests includes maintaining object hierarchies, relationships, and dependencies for any of the plurality of online transaction requests.

10. The one or more storage mediums of claim 9, wherein maintaining object hierarchies, relationships, and dependencies includes receiving identifications from the order management service and applying the received identifications for following transaction records.

11. A system comprising:
    one or more processors;
    a data storage to store data, including data for online transaction requests; and
    a network interface to receive the online transaction requests for an order management service, wherein the system is to:
    process a plurality of online transaction requests for the order management service to generate transaction records, the online transaction requests including at least a first type of commerce transaction and a second, different type of commerce transaction;
    accumulate the processed transaction records in a storage;
    determine throughput rates for processing of one or more sequences of the transaction records;
    generate application program interface (API) requests for the one or more sequences of transaction records, including automatically selecting a type of API request and determining a batch size and a frequency rate for the API requests based at least in part on the determined throughput rates for the transaction records; and
    process the generated API requests to the order management service according to the determined batch size and frequency rate.

12. The system of claim 11, wherein the first type of commerce transaction is a Business-to-Consumer (B2C) transaction and the second type of commerce transaction is a Business-to-Business (B2B) transaction.

13. The system of claim 11, wherein the system is further to:
    validate authentication to the order management service and validate data formats of the plurality of online transaction requests, including the system to validate data formats for the first type of commerce transaction and a second type of commerce transaction.

14. The system of claim 11, wherein the system is further to:
    dynamically throttle the accumulated API requests for the transaction records based on one or more resource limitations.

15. The system of claim 11, wherein:
  determining throughput rates for processing of the one or more sequences of transaction records includes the system to determine the throughput rate as being one of a low throughput or a high throughput; and
  wherein the system is further to:
  utilize a first type of API request if a sequence of transaction records has a low throughput and utilize a second type of API request if the sequence of transaction records has a high throughput.

16. The system of claim 15, wherein a sequence of transaction records has a low throughput if a total number of transaction records accumulated in a specified time period is less than a threshold, and the sequence of transaction records has a high throughput if the total number of transaction records accumulated in the specified time period is greater than or equal to the threshold.

17. The system of claim 15, wherein the first type of API request is a SOAP (Simple Object Access Protocol) API request and the second type of API request is a REST (Representational State Transfer) Bulk API request.

18. The system of claim 15, wherein processing the generated API requests to the order management service includes the system to process the API requests in parallel by a pool of worker threads.

19. The system of claim 11, wherein processing the plurality of online transaction requests includes the system to maintain object hierarchies, relationships, and dependencies for any of the plurality of online transaction requests.

20. The system of claim 19, wherein maintaining object hierarchies, relationships, and dependencies includes the system to receive identifications from the order management service and apply the received identifications for following transaction records.

21. A method comprising:
  processing a plurality of online transaction requests for an order management service to generate transaction records, the online transaction requests including one or more Business-to-Consumer (B2C) transactions and one or more Business-to-Business (B2B) transactions;
  accumulating the processed transaction records in a storage;
  determining throughput rates for processing of one or more sequences of the transaction records;
  generating application program interface (API) requests for the one or more sequences of transaction records, including automatically selecting a type of API request and determining a batch size and a frequency rate for the API requests based at least in part on the determined throughput rates for the one or more sequences of transaction records; and
  process the generated API requests to the order management service according to the determined batch size and frequency rate.

22. The method of claim 21, further comprising:
  dynamically throttling the accumulated API requests for the transaction records based on one or more resource limitations.

23. The method of claim 21, wherein:
  determining throughput rates for processing of the one or more sequences of transaction records including determining the throughput rate as being one of a low throughput or a high throughput; and
  further comprising:
  utilizing a first type of API request if a sequence of transaction records has a low throughput and utilizing a second type of API request if the sequence of transaction records has a high throughput.

24. The method of claim 21, wherein processing the plurality of online transaction requests includes maintaining object hierarchies, relationships, and dependencies for any of the plurality of online transaction requests.

* * * * *